United States Patent [19]

Alvelda

[11] Patent Number: 5,248,045
[45] Date of Patent: Sep. 28, 1993

[54] METHOD AND APPARATUS FOR UNCASING AND SORTING BOTTLES

[75] Inventor: Philip E. Alvelda, Atlanta, Ga.
[73] Assignee: The Coca-Cola Company, Atlanta, Ga.
[21] Appl. No.: 805,937
[22] Filed: Dec. 12, 1991
[51] Int. Cl.$^5$ .............................................. B03B 5/60
[52] U.S. Cl. ..................... 209/522; 198/493; 209/158; 209/932; 209/173
[58] Field of Search .................. 198/485.1, 486.1, 493; 209/3.1, 158, 173, 522, 644, 645, 925, 932

[56] References Cited

U.S. PATENT DOCUMENTS

| | | | |
|---|---|---|---|
| 2,698,087 | 12/1954 | Call et al. | 209/158 |
| 3,212,620 | 10/1965 | Adams et al. | 198/493 |
| 3,326,350 | 6/1967 | Cromer et al. | 198/493 |
| 3,771,649 | 11/1973 | Strauss | 209/522 |
| 3,822,015 | 7/1974 | Hsieh et al. | 209/173 |
| 3,971,474 | 7/1976 | Clement | 209/173 |
| 4,375,264 | 3/1983 | Porter | 209/932 |
| 4,801,001 | 1/1989 | Gibbemeyer | 198/485.1 |
| 4,938,338 | 7/1990 | Crawford et al. | 198/493 |

FOREIGN PATENT DOCUMENTS 6409992  3/1966  Netherlands ................. 98/485.1

Primary Examiner—Robert P. Olszewski
Assistant Examiner—Steven M. Reiss
Attorney, Agent, or Firm—Birch, Stewart, Kolasch & Birch

[57] ABSTRACT

An uncasing and sorting machine for refillable plastic bottles includes a first conveyor arrangement having an inlet section, an intermediate section, and an outlet section, the intermediate section being positioned within a water bath. Crates of sortable bottles are carried by the first conveyor through the described sections such that lightweight plastic bottles are allowed to float within the water bath. To assist in the upward lift of the lightweight bottles in the water bath, a secondary propulsion force of air or water is provided beneath the bottles. Those bottles which are lifted due to their combined buoyancy and the secondary propulsion force, are transported to a separate facility via a secondary conveyor of either mechanical or air type.

93 Claims, 4 Drawing Sheets

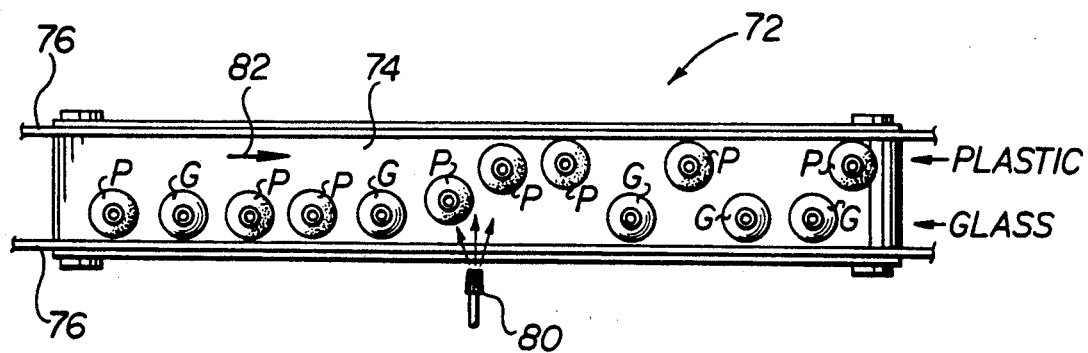
FIG 6
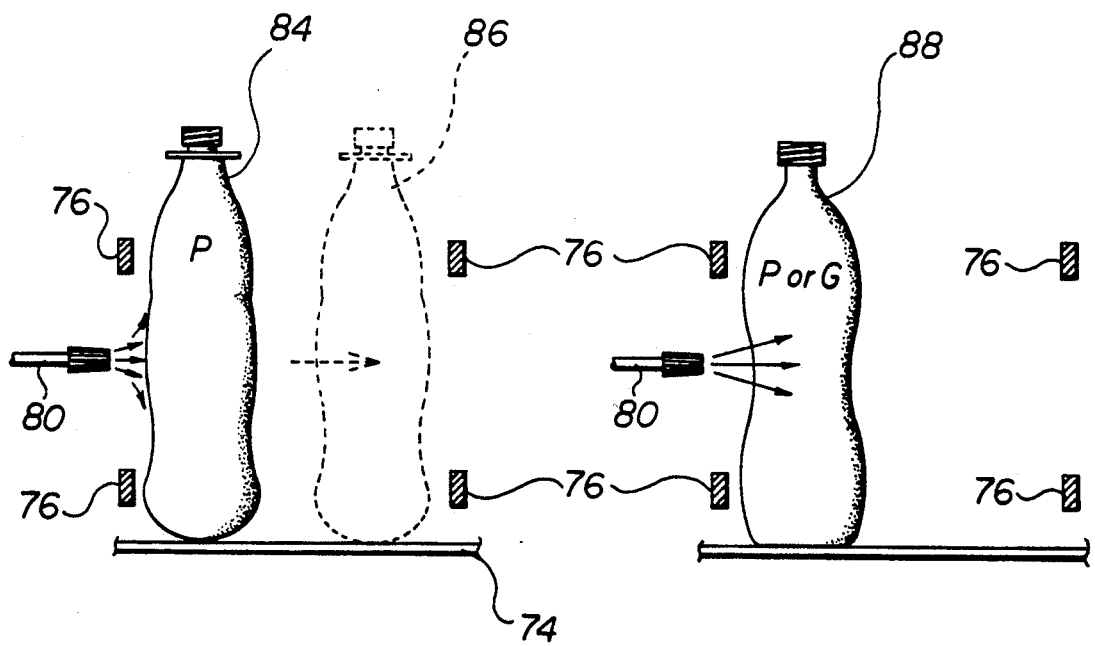
FIG 7　　FIG 8

METHOD AND APPARATUS FOR UNCASING AND SORTING BOTTLES

BACKGROUND OF THE INVENTION

1. Field of the Invention

The present application is directed to a method and apparatus for sorting articles, and more particularly to a method and apparatus for sorting articles of differing densities or weight such as glass and plastic bottles.

2. Description of Related Art

Heretofore, the sorting of glass and plastic bottles has been accomplished by manually examining a plurality of glass and/or plastic bottles housed within a storage crate to determine the composition of the bottles therein and whether the bottles contain liquid which is a contaminant in the recycling process if present in greater than a predetermined amount within the bottle. This manual examination often required the physical removal of plastic bottles from the crate to determine if excessive liquid was present therein. It can be appreciated that a manual examination of each bottle within a crate of twelve to sixteen bottles will be both time consuming and labor intensive.

Accordingly, a need in the art exists for a substantial increase in speed of examination and resulting sorting of glass and plastic bottles within the bottling industry. It should be understood, however, that the method and apparatus disclosed herein, while being presented in the context of bottle sorting, is equally applicable to the high speed sorting of virtually any articles which are sorted according to the density or weight thereof.

SUMMARY OF THE INVENTION

Accordingly, it is a primary object of the present invention to provide a method and apparatus for uncasing and sorting refillable plastic bottles.

It is a further object of the present invention to utilize an inherent buoyancy of an empty refillable plastic bottle to displace the same with respect to partially filled plastic bottles and glass bottles in the uncasing and sorting method and apparatus disclosed.

The objects of the present invention are fulfilled by providing an apparatus for sorting articles by weight comprising:

a water bath;

means for positioning a plurality of articles within said water bath; and means for applying substantially the same predetermined vertical lifting force to a bottom end of each of said plurality of articles within said water bath, whereby the buoyant force applied to each of said plurality of articles in combination with said vertical lifting force raises lighter ones of said plurality of articles to a predetermined height above remaining ones of said plurality of articles.

The objects of the present invention are further fulfilled by providing a method for sorting articles comprising the steps of:

(a) conveying sequential crates of articles, each crate containing a plurality of articles, into a water bath;

(b) applying substantially the same predetermined vertical lifting force to a bottom end of each of said plurality of articles, whereby the buoyant force applied to each of said plurality of articles in combination with said vertical lifting force raises lighter ones of said plurality of articles to a predetermined height above remaining ones of said plurality of articles;

(c) extracting vertically lifted and buoyed ones of said plurality of articles from said crate;

(d) conveying extracted ones of said plurality of articles in a first direction away from said water bath; and (e) conveying said crates sequentially out of said water bath.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is a top plan view of a sorting apparatus according to a third embodiment of the present invention;

FIG. 7 is an end elevational view of the sorting apparatus shown in FIG. 6 for sorting a straight wall bottle; and FIG. 8 is an end elevational view of the sorting apparatus shown in FIG. 6 for sorting a pinched profile bottle.

DETAILED DESCRIPTION OF PREFERRED EMBODIMENTS

Figure 1:
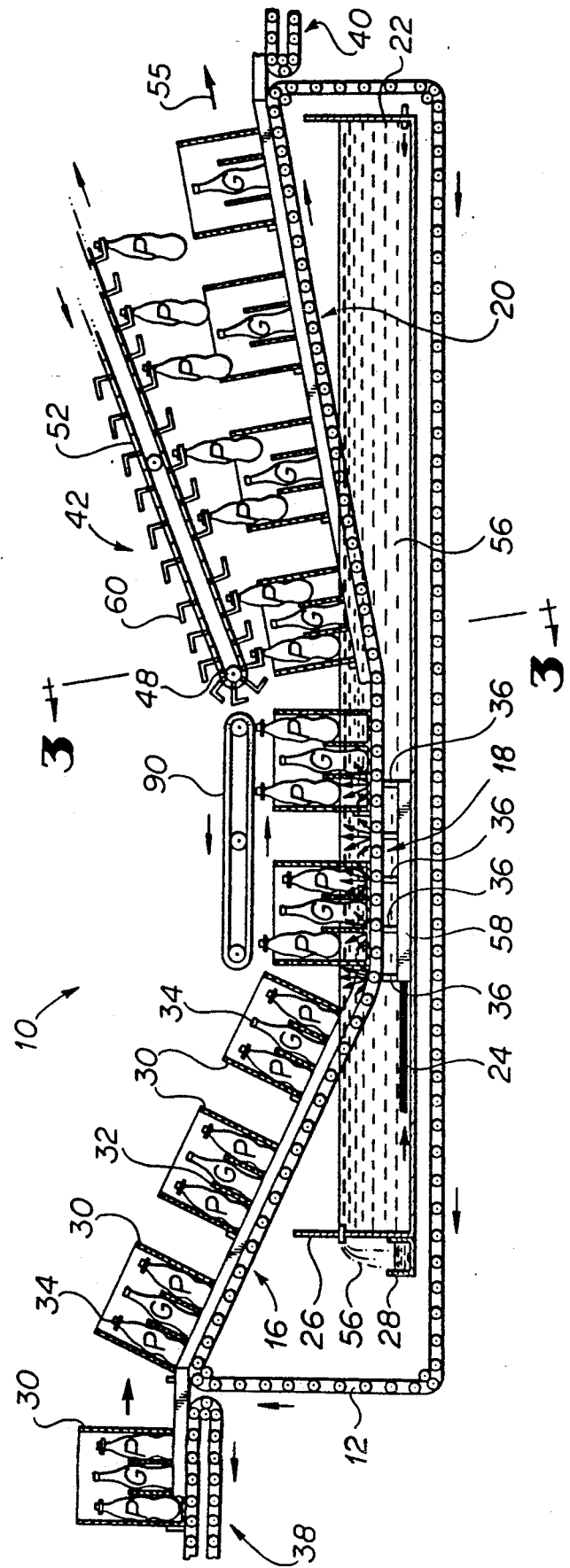
FIG. 1 is a front cross-sectional view of a sorting apparatus according to a first embodiment of the present invention.

Referring in general to FIG. 1, there is shown a first embodiment of the uncasing and sorting device for refillable plastic bottles of the present invention, generally indicated at 10.

Shown at 12 is an endless conveyor which includes an inlet section 16, an intermediate section 18, and an outlet section 20. As shown in FIG. 1, the inlet section 16 and the outlet section 20 are inclined with respect to the intermediate section 18. A water bath 22 of a sufficient size is provided generally in the vicinity of the intermediate section 18 such that the intermediate section 18 of the endless conveyor 12 is completely submerged within the water bath 22. An overflow wall 26 is provided along with an overflow drain 28 to enable excess water 56 to be removed from the water bath 22. An inlet pipe 24 is provided for introducing water into the water bath, this inlet pipe 24 either drawing water from a fresh supply or drawing water from the overflow drain 28 to recycle water within the system. As an alternative, a cleaning solution with caustic and additives may be utilized in place of water within the water bath housing 22 in order to clean articles conveyed therethrough.

Figure 3:
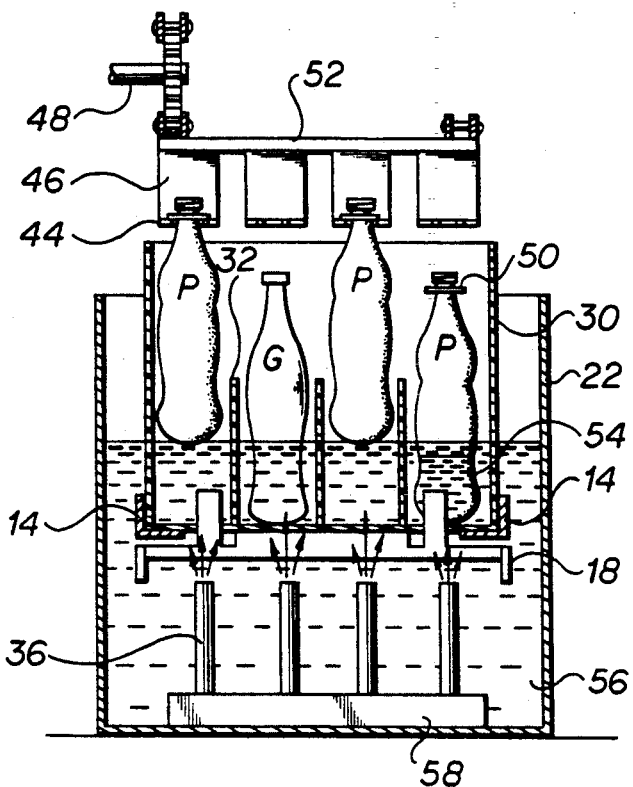
FIG. 3 is a cross-sectional view taken along line 3—3 of FIG. 1.

A plurality of crates 30 are shown being sequentially fed along the endless conveyor 12, these crates being securely positioned in place by means of crate guides 14 on two sides of each crate as shown most clearly in FIG. 3. A crate 30 is placed on the conveyor 12 at a supply conveyor 38 and is then transported down the inclined inlet section 16 into the intermediate section 18 at which point the contents of the crate are at least partially submerged in water within the water bath 22. According to the present invention, a plurality of articles such as glass and plastic bottles are provided within each of the crates 30, the bottles being randomly indicated as "P" or "G" to indicate their plastic or glass nature, respectively. Each of the crates 30 are divided into a number of sections by dividers 32, with one glass or plastic bottle being inserted into each section of the crate. As the crates 30 containing bottles 34 are conveyed into the water bath at the intermediate section 18, the plastic bottles which are empty will be displaced by water from the water bath, thereby causing these bottles to float to a predetermined height within the water bath. In order to assist in the vertical displacement of the bottles, jets 36 dispensing either air or water are positioned beneath the intermediate section 18 of the conveyor 12 in order to impart a lifting force to the bottoms of the containers. It should be understood that glass containers and plastic bottles having liquid therein will not have sufficient buoyancy, even with the use of jets 36 directing air or water against the bottoms thereof to overcome the weight of the glass bottle or a plastic bottle filled at least partially with liquid.

In order to limit a maximum vertical distance of buoyed plastic bottles, there is provided a limit conveyor 90 positioned directly above the intermediate conveyor section 18. The endless belt of limit conveyor 90 travels at the same linear rate of speed as the primary endless conveyor 12. An added advantage of preventing tipping of lifted or buoyed plastic bottles is also obtained since the buoyed plastic bottles will no longer be maintained in place by dividers 32 of the crates 30 once they are in an elevated position with respect to the crate.

Figure 4:
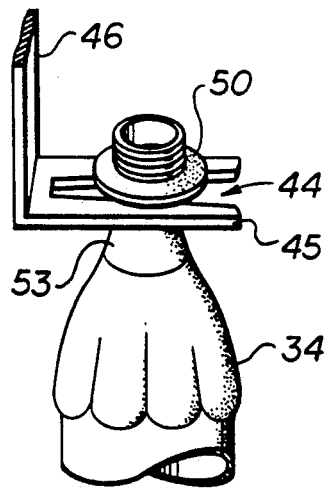
FIG. 4 is an enlarged view of a bottle gripping device of FIG. 1.

As further shown in FIG. 1, bottles whose bases are lifted to a surface substantially even with the surface of the water 56 in water bath 22 are grasped by an upper mechanical conveyor 42 having bottle grippers 60 sequentially formed along the belt thereof for gripping an underneath portion of a bottle flange 50 as shown in FIG. 4. Contributing factors in the secure engagement of bottles by the upper mechanical conveyor 42 is the buoyancy combined with the speed of travel of the elevated bottle. These factors are equally applicable to the embodiment shown and described hereinbelow in connection with FIG. 2.

As further shown in FIG. 4, the bottle neck 53 is gripped in a horizontal slot 44 defined by horizontal arms 45, the horizontal arms 45 projecting perpendicularly from a vertical arm 46 to support the flange 50. The vertical arm 46 is connected by any suitable means to a belt of the upper mechanical conveyor 42. As the crates 30 are transported up the inclined outlet section 20, the upper mechanical conveyor 42 withdraws the plastic bottles from the crates for transport via the conveyor 42 to a remote location. The crates 30 which now contain only glass bottles or plastic bottles at least partially filled with fluid are transported to the disposal conveyor 40 for further sorting of the glass and plastic containers therein.

Regarding the jet system for imparting a lifting force to glass and plastic bottles within the crates in the intermediate section 18, it should be understood that the combination of buoyancy imparted to the empty plastic bottles due to the depth of the water along with the force of air or water being expelled from jets 36 will be sufficient to maintain the empty plastic bottles at a predetermined height above the remaining bottles which are not displaced by the combination of buoyancy and jets 36.

FIG. 3 is a cross-sectional view taken along line 3—3 of FIG. 1 in which it is shown that the crates contain at least four bottles in a cross-wise direction thereof, and that there will be a corresponding number of bottle grippers 60 formed in a widthwise direction across the conveyor belt 52 of the upper mechanical conveyor 42. Also as shown in FIG. 3, the sides of the crate 30 are gripped by crate guides 14 on two sides thereof in order to secure the crate in position as it travels along the endless conveyor 12 Further, there are four rows of jets 36, one row of jets 36 being provided for each row of bottles. A supply of air or water 58 is shown at the base of the water bath 22 for imparting the upward lifting force to the bottles within the crate.

Figure 2:
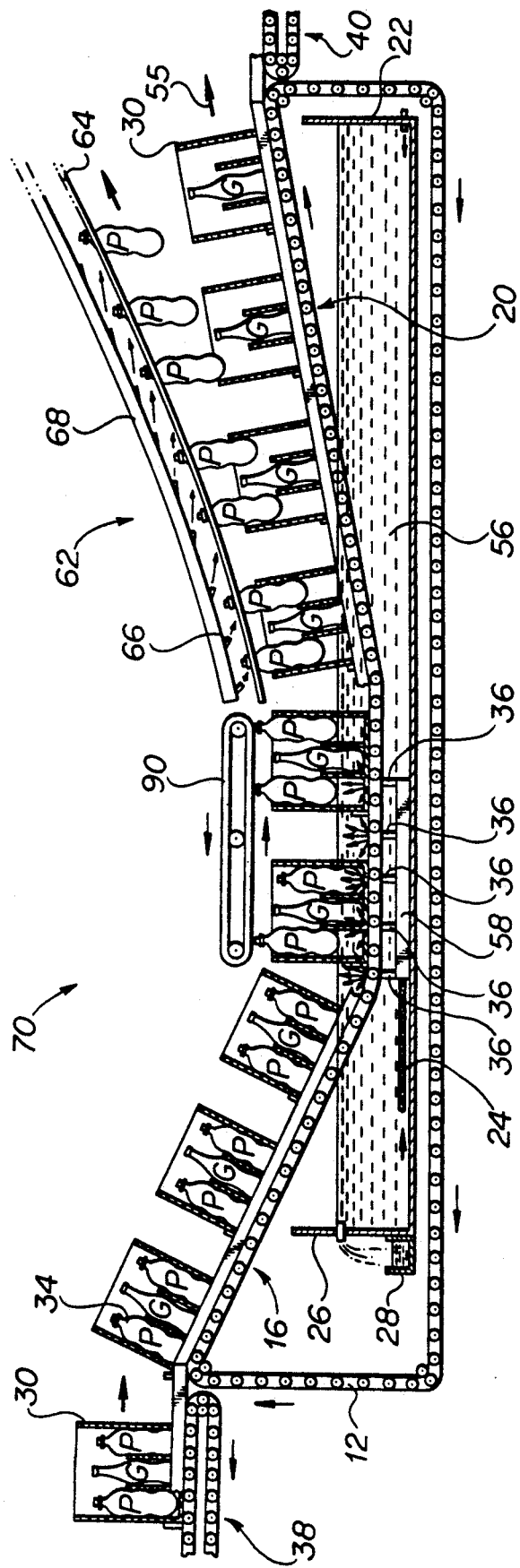
FIG. 2 is a front cross-sectional view of the sorting apparatus according to a second embodiment of the present invention.

Referring now to FIG. 2, there is shown a second embodiment 70 of the sorting device of the present invention. Like parts will be described with like reference numerals herein for the sake of simplicity and clarity.

The embodiment shown in FIG. 2 utilizes an air conveyor 62 for transporting bottles 34 out of the crates 30 to a remote location, once they have been buoyed and lifted upward by the combination of water 56 and jets 36 in the water bath 22.

Figure 5:
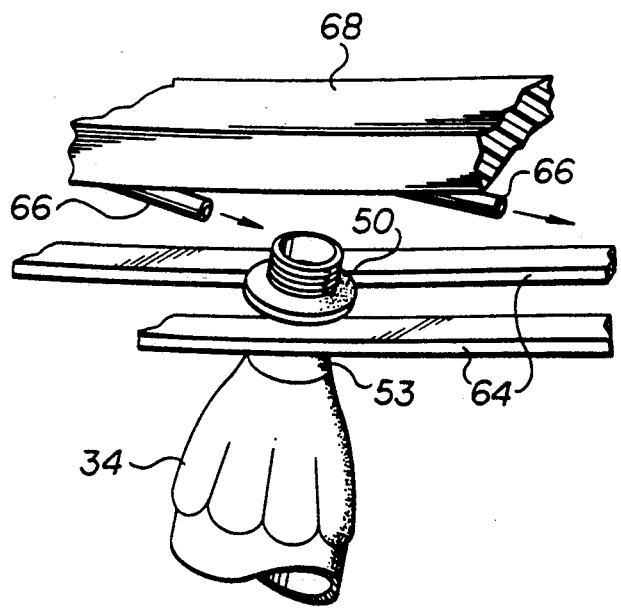
FIG. 5 is an enlarged view of a bottle transporting device of FIG. 2.

As shown in more detail in FIG. 5, an air supply 68 is provided for a plurality of air jets 66, which jets are angularly directed at an upper portion of bottle 34 in order to move the bottle along a pair of guide rails 64 to a remote location. Specifically, the flange 50 rests on the surface of the guide rails 64 and air expelled from air jets 66 against the mouth of the bottle will be sufficient to force the bottle along the guide rails 64. Thus, as the crates 30 proceed forward in the direction indicated by arrow 55, the bottles 34 that are lifted to the predetermined height within the water bath 22 will engage the bottle flange 50 over the two guide rails 64. The bottles are then lifted from the crates as the crates move forward and the crates continue on the outlet section 20 of the lower conveyor to a lower level or disposal conveyor as indicated at 40.

In the device of the first and second embodiments, and as has previously been indicated, the water in the water bath 22 may be recirculated and is able to provide for an initial rinse of the outside wall of the bottles, thereby reducing grime that can contribute to scuffing.

The apparatus can be constructed at a lower cost and yield a high-speed capacity, preferably up to 1,000 bottles per minute. The bottles may be conveyed out of the crates in four rows, with two guide rails per row, for a case of twelve bottles, and combined into one row by proper controls that stop the flow of each row successively.

Referring now to FIG. 6, there is generally shown a third embodiment 72 of the present invention in which plastic and glass bottles are sorted using a burst of air against a side wall of each of the bottles. A smooth conveyor belt 74 is shown having guide rails 76 on opposing longitudinal sides thereof. Feeding of the bottles 78 of either glass "G" or plastic "P" in the linear direction is interrupted by a burst of air from air nozzle 80 against a lateral side of the glass and plastic bottles. As shown in FIG. 7, a straight wall bottle will be displaced laterally by air nozzle 80 from an initial position 84 to a displaced position 86. Thus, a stream of air is applied to the perimeter of the traveling bottles so that light plastic bottles are displaced laterally to an opposing guide rail. The section of the air stream and its intensity may be adjusted and/or designed to suit the type and size of bottles such that the heavier glass bottles are not displaced while the plastic bottles are laterally displaced.

Similarly, the device is also designed to laterally displace bottles of any material, including glass and plastic, that have a predetermined shape, while leaving other bottles of different shapes in an undisplaced location. In particular, a cylindrical bottle having straight walls as shown in FIG. 7 will be displaced because the wall is close to the tip of the air nozzle, but a bottle with a pinched profile as shown in FIG. 8 will not be displaced because the air will dissipate without exerting sufficient force to displace the bottle, primarily due to the fact that the nozzle is at a greater distance from the side wall of the container. The shape of the air stream, direction and intensity can be adjusted and revised using nozzles, slots, holes, and/or punched shapes on sheets on the wall of chambers or pipes with air under pressure with pumps, compressors, and the like.

The lateral guide rails provided with the nozzles, slots, and/or holes are oriented in such a manner as to cushion the bottles being laterally displaced, and such guides are also provided with air under pressure.

The invention being thus described, it will be obvious that the same may be varied in many ways. Such variations are not be regarded as a departure from the spirit and scope of the invention, and all such modifications as would be obvious to one skilled in the art are intended to be included within the scope of the following claims.

I claim:

1. An apparatus for selectively sorting articles by weight comprising:
   a water bath;
   means for positioning a plurality of articles within said water bath; and
   means for applying substantially the same predetermined vertical lifting force to a bottom end of each of said plurality of articles within said water bath, whereby the buoyant force applied to each of said plurality of articles in combination with said vertical lifting force raises lighter ones of said plurality of articles to a predetermined height above remaining ones of said plurality of articles, wherein said means for positioning includes a crate evenly partitioned into a plurality of sections for receiving corresponding ones of said plurality of articles, each of said plurality of sections being at least partially open on a floor of said crate to enable passage of said predetermined vertical lifting force.

2. The apparatus for selectively sorting articles by weight according to claim 1, wherein said means for positioning further includes a crate conveyor for transporting a plurality of said crates continuously and sequentially through an inlet section entering said water bath, an intermediate section within said water bath, and an outlet section exiting said water bath, said crate conveyor securing each of said plurality of crates thereto and allowing selective vertical displacement of said lighter ones of said plurality of articles.

3. The apparatus for selectively sorting articles by weight according to claim 2, further including an article conveyor positioned above the outlet section of said crate conveyor for removing said lighter ones of said plurality of articles at the predetermined height from said crate from the remaining ones of said plurality of articles.

4. The apparatus for selectively sorting articles by weight according to claim 2, wherein said article conveyor includes means for propelling said lighter ones of said plurality of articles away from said water bath.

5. The apparatus for selectively sorting articles by weight according to claim 4, wherein said means for propelling includes a series of air jets and parallel guide rails, whereby a portion of each of said lighter ones of said plurality of articles is slidable along said guide rails by said series of air jets.

6. The apparatus for selectively sorting articles by weight according to claim 5, wherein said guide rails are positioned above the outlet section of said crate conveyor and said series of air jets are linearly positioned above said guide rails.

7. The apparatus for selectively sorting articles by weight according to claim 4, wherein said means for propelling includes a mechanical conveyor having a receiving slot for gripping a predetermined portion of said article.

8. The apparatus for selectively sorting articles by weight according to claim 7, wherein said mechanical conveyor is linearly positioned above the outlet section of said primary conveyor.

9. The apparatus for selectively sorting articles by weight according to claim 1, wherein said means for applying a predetermined vertical lifting force includes a plurality of jets of water directed vertically of the water bath, one of said plurality of jets of water being directed at the bottom of each of said plurality of articles, respectively.

10. The apparatus for selectively sorting articles by weight according to claim 1, wherein said means for applying a predetermined vertical lifting force includes a plurality of jets of air directed vertically of the water bath, one of said jets of air being directed at the bottom of each of said plurality of articles, respectively.

11. The apparatus for selectively sorting articles by weight according to claim 1, wherein said plurality of articles include glass and plastic bottles, and wherein the weight of said glass and plastic bottles determines the degree of displacement within said water bath and the magnitude of said predetermined vertical lifting force is more than that required to complete the vertical displacement of an empty plastic bottle and less than that required to complete the vertical displacement of at least partially filled plastic bottles and glass bottles.

12. An apparatus for selectively sorting articles by weight comprising:
   a primary conveyor including an inlet section, an intermediate section and an outlet section;
   means for supporting a plurality of sortable articles for linear movement on said primary conveyor;
   a water bath positioned in the intermediate section of said primary conveyor, said water bath imparting a buoyant force to said plurality of sortable articles;
   means for applying substantially the same predetermined vertical lifting force to a bottom end of each of said plurality of sortable articles within said water bath, whereby a buoyant force imparted to said plurality of sortable articles by said water bath in combination with said predetermined vertical lifting force raises lighter ones of said plurality of sortable articles to a predetermined height within said water bath above remaining ones of said plurality of sortable articles; and a secondary conveyor positioned above the outlet section of said primary conveyor for gripping and removing said lighter ones of said plurality of sortable articles at the predetermined height from said remaining ones of said plurality of sortable articles, wherein said means for supporting includes a crate evenly partitioned into a plurality of sections for receiving corresponding ones of said plurality of sortable articles, each of said plurality of sections being at least partially open on a floor of said crate to enable passage of said predetermined vertical lifting force therethrough.

13. The apparatus for selectively sorting articles by weight according to claim 12, wherein said means for applying substantially the same predetermined vertical lifting force includes a plurality of jets of water directed vertically of the water bath, one of said plurality of jets of water being directed at the bottom of each of said plurality of sortable articles, respectively.

14. The apparatus for selectively sorting articles by weight according to claim 12, wherein said means for applying substantially the same predetermined vertical lifting force includes a plurality of jets of air directed vertically of the water bath, one of said plurality of jets of air being directed at the bottom of each of said plurality of sortable articles, respectively.

15. The apparatus for selectively sorting articles by weight according to claim 12, wherein said plurality of sortable articles include glass and plastic bottles, the weight of said glass and plastic bottles determining the degree of displacement within said water bath and the magnitude of said predetermined vertical lifting force is more than that required to complete the vertical displacement of an empty plastic bottle and less than that required to complete the vertical displacement of at least partially filled plastic bottles and glass bottles.

16. The apparatus for selectively sorting articles by weight according to claim 12, wherein said secondary conveyor includes means for propelling lighter ones of said plurality of sortable articles away from said water bath.

17. The apparatus for selectively sorting articles by weight according to claim 16, wherein said means for propelling includes a series of air jets and parallel guide rails, whereby a portion of each of said lighter ones of said plurality of sortable articles is slidable along said guide rails by said series of air jets.

18. The apparatus for selectively sorting articles by weight according to claim 17, wherein said guide rails are positioned above the outlet section of said primary conveyor and said series of air jets are linearly positioned above said guide rails.

19. The apparatus for selectively sorting articles by weight according to claim 16, wherein said means for propelling includes a mechanical conveyor having a receiving slot for gripping a predetermined portion of each of said lighter ones of said plurality of sortable articles.

20. The apparatus for selectively sorting articles by weight according to claim 19, wherein said mechanical conveyor is linearly positioned above the outlet section of said primary conveyor.

21. The apparatus for selectively sorting articles by weight according to claim 12, further including means for limiting said predetermined height and thereby preventing tipping of said lighter ones of said plurality of sortable articles prior to being gripped by said secondary conveyor.

22. The apparatus for selectively sorting articles by weight according to claim 21, wherein said means for limiting is a third conveyor positioned above the intermediate section of said primary conveyor, a belt of said third conveyor moving at a speed corresponding to a rate of movement of said primary conveyor.

23. An apparatus for selectively sorting articles by weight comprising:
a primary conveyor including an inlet section, an intermediate section, and an outlet section;
means for supporting a plurality of articles for linear movement on said primary conveyor;
a water bath positioned in the intermediate section of said primary conveyor, said water bath imparting substantially the same buoyant vertical force to each of said plurality of articles, whereby the buoyant vertical force raises lighter ones of said plurality of articles to a predetermined height in said water bath above remaining ones of said plurality of articles; and
a secondary conveyor positioned above the outlet section of said primary conveyor for gripping and removing said lighter ones of said plurality of articles at the predetermined height from said remaining ones of said plurality of articles, wherein said means for supporting includes a crate evenly partitioned into a plurality of sections for receiving corresponding ones of said plurality of articles, each of said plurality of sections being at least partially open on a floor of said crate to enable passage of said buoyant vertical force therethrough.

24. The apparatus for selectively sorting articles by weight according to claim 23, wherein said secondary conveyor includes means for propelling said lighter ones of said plurality of articles away from said water bath.

25. The apparatus for selectively sorting articles by weight according to claim 24, wherein said means for propelling includes a series of air jets and parallel guide rails, whereby a portion of each of said lighter ones of said plurality of articles is slidable along said guide rails by said series of air jets.

26. The apparatus for selectively sorting articles by weight according to claim 25, wherein said guide rails are positioned above the outlet section of said primary conveyor and said series of air jets are linearly positioned above said guide rails.

27. The apparatus for selectively sorting articles by weight according to claim 24, wherein said means for propelling includes a mechanical conveyor having a receiving slot for gripping a predetermined portion of each of said lighter ones of said plurality of articles.

28. The apparatus for selectively sorting articles by weight according to claim 27, wherein said mechanical conveyor is linearly positioned above the outlet section of said primary conveyor.

29. The apparatus for selectively sorting articles by weight according to claim 23, wherein said plurality of articles include glass and plastic bottles, and wherein the weight of said glass and plastic bottles determines the degree of displacement within said water bath and the magnitude of said buoyant vertical force is more than that required to complete the vertical displacement of an empty plastic bottle and less than that required to complete the vertical displacement of partially filled plastic bottles and glass bottles.

30. The apparatus for selectively sorting articles by weight according to claim 23, further including means for limiting said predetermined height and thereby preventing tipping of said lighter ones of said plurality of articles prior to being gripped by said secondary conveyor.

31. The apparatus for selectively sorting articles by weight according to claim 30, wherein said means for limiting is a third conveyor positioned above the intermediate section of said primary conveyor, a belt of said third conveyor moving at a speed corresponding to a rate of movement of said primary conveyor.

32. An apparatus for selectively sorting articles by weight composition:
- a primary conveyor including an inlet section, an intermediate section, and an outlet section;
- means for supporting a plurality of articles for linear movement on said primary conveyor;
- means, positioned in the intermediate section of said conveyor, for applying substantially the same predetermined vertical lifting force generated by a fluid against a bottom end of each of said plurality of articles, whereby the predetermined vertical lifting force raises lighter ones of said plurality of articles to a predetermined height above remaining ones of said plurality of articles; and
- a secondary conveyor positioned above the outlet section of said primary conveyor for gripping and removing said lighter ones of said plurality of articles at the predetermined height from said remaining ones of said plurality of articles, wherein said means for supporting includes a crate evenly partitioned into a plurality of sections for receiving corresponding ones of said plurality of articles, each of said plurality of sections being at least partially open on a floor of said crate to enable passage of said predetermined vertical lifting force therethrough.

33. The apparatus for selectively sorting articles by weight according to claim 32, wherein said means for applying substantially the same predetermined vertical lifting force includes a plurality vertically directed of jets of air, one of said plurality of jets of air being directed at the bottom of each of said plurality of articles, respectively.

34. The apparatus for selectively sorting articles by weight according to claim 32, wherein said means for applying substantially the same predetermined vertical lifting force includes a plurality of jets of water directed vertically of the intermediate conveyor section, one of said plurality of jets of water being directed at the bottom of each of said plurality of articles, respectively.

35. The apparatus for selectively sorting articles by weight according to claim 32, wherein said plurality of articles include glass and plastic bottles, and wherein the weight of said glass and plastic bottles determines the degree of lift of said glass and plastic bottles by said predetermined vertical lifting force and the magnitude of said predetermined vertical lifting force is more than that required to complete the vertical displacement of an empty plastic bottle and less than that required to complete the vertical displacement of at least partially filled plastic bottles and glass bottles.

36. The apparatus for selectively sorting articles by weight according to claim 32, wherein said means for propelling includes a mechanical conveyor having a receiving slot for gripping a predetermined portion of each of said lighter ones of said plurality of articles.

37. The apparatus for selectively sorting articles by weight according to claim 36, wherein said mechanical conveyor is linearly positioned above the outlet section of said primary conveyor.

38. The apparatus for selectively sorting articles by weight according to claim 32, wherein said secondary conveyor includes means for propelling said lighter ones of said plurality of articles away from said water bath.

39. The apparatus for selectively sorting articles by weight according to claim 38, wherein said means for propelling includes a series of air jets and parallel guide rails, whereby a portion of each of said lighter ones of said plurality of articles is slidable along said guide rails by said series of air jets.

40. The apparatus for selectively sorting articles by weight according to claim 39, wherein said guide rails are positioned above the outlet section of said primary conveyor and said series of air jets are linearly positioned above said guide rails.

41. The apparatus for selectively sorting articles by weight according to claim 32, further including means for limiting said predetermined height and thereby preventing tipping of said lighter ones of said plurality of articles prior to being gripped by said secondary conveyor.

42. The apparatus for selectively sorting articles by weight according to claim 41, wherein said means for limiting is a third conveyor positioned above the intermediate section of said primary conveyor, a belt of said third conveyor moving at a speed corresponding to a rate of movement of said primary conveyor.

43. An apparatus for selectively sorting glass and plastic bottles by weight comprising:
- a primary conveyor including an inlet section, an intermediate section, and an outlet section;
- means for supporting a plurality of glass and plastic bottles for linear movement on said primary conveyor;
- a water bath positioned in the intermediate section of said primary conveyor, said water bath uniformly imparting a buoyant vertical force to said plurality of glass and plastic bottles, whereby the buoyant vertical force of said water bath raises empty plastic bottles to a predetermined height in said water bath above at least partially filled plastic bottles and glass bottles; and
- a secondary conveyor positioned above the outlet section of said primary conveyor for gripping and removing said empty plastic bottles at the predetermined height from said at least partially filled plastic bottles and said glass bottles, wherein said means for supporting includes a crate evenly partitioned into a plurality of sections for receiving corresponding ones of said plurality of glass and plastic bottles, each of said plurality of sections being at least partially open on a floor of said crate to enable passage of said buoyant vertical force therethrough.

44. The apparatus for selectively sorting glass and plastic bottles by weight according to claim 43, wherein the weight of said glass and plastic bottles determines the degree of displacement within said water bath.

45. The apparatus for selectively sorting glass and plastic bottles by weight according to claim 43, wherein said secondary conveyor includes means for propelling said empty plastic bottles away from said water bath.

46. The apparatus for selectively sorting glass and plastic bottles by weight according to claim 45, wherein said means for propelling includes a series of air jets and parallel guide rails, whereby a portion of said empty plastic bottle is slidable along said guide rails by said series of air jets.

47. The apparatus for selectively sorting glass and plastic bottles by weight according to claim 46, wherein said guide rails are positioned above the outlet section of said primary conveyor and said series air jets are linearly positioned above said guide rails.

48. The apparatus for selectively sorting glass and plastic bottles by weight according to claim 45, wherein said means for propelling includes a mechanical conveyor having a receiving slot for gripping a predetermined portion of said empty plastic bottle.

49. The apparatus for selectively sorting glass and plastic bottles by weight according to claim 48, wherein said mechanical conveyor is linearly positioned above the outlet section of said guide rail.

50. The apparatus for selectively sorting glass and plastic bottles by weight according to claim 43, further including means for limiting said predetermined height and thereby preventing tipping of said empty plastic bottles prior to being gripped by said secondary conveyor.

51. The apparatus for selectively sorting glass and plastic bottles by weight according to claim 50, wherein said means for limiting is a third conveyor positioned above the intermediate section of said primary conveyor, a belt of said third conveyor moving at a speed corresponding to a rate of movement of said primary conveyor.

52. An apparatus for selectively sorting glass and plastic bottles by weight comprising:
- a primary conveyor including an inlet section, an intermediate section, and an outlet section;
- means for supporting a plurality of glass and plastic bottles for linear movement on said primary conveyor;
- means, positioned in the intermediate section of said primary conveyor for applying substantially the same predetermined vertical lifting force generated by a fluid against a bottom end of each of said plurality of glass and plastic bottles, whereby the predetermined vertical lifting force raises empty plastic bottles to a predetermined height above at least partially filled plastic bottles and glass bottles; and
- a secondary conveyor positioned above the outlet section of said primary conveyor for gripping and removing said empty plastic bottles at the predetermined height from said at least partially filled plastic bottles and said glass bottles, wherein said means for supporting includes a crate evenly partitioned into a plurality of sections for receiving corresponding ones of said plurality of glass and plastic bottles, each of said plurality of sections being at least partially open on a floor of said crate to enable passage of said predetermined vertical lifting force therethrough.

53. The apparatus for selectively sorting glass and plastic bottles by weight according to claim 52, further including means for limiting said predetermined height and thereby preventing tipping of said empty plastic bottles prior to being gripped by said secondary conveyor.

54. The apparatus for selectively sorting glass and plastic bottles by weight according to claim 53, wherein said means for limiting is a third conveyor positioned above the intermediate section of said primary conveyor, a belt of said third conveyor moving at a speed corresponding to a rate of movement of said primary conveyor.

55. The apparatus for selectively sorting glass and plastic bottles by weight according to claim 52, wherein said means for applying a predetermined vertical lifting force includes a plurality of jets of water directed vertically of the intermediate conveyor section, one of said plurality of jets of water being directed at the bottom of each of said plurality of glass and plastic bottles, respectively.

56. The apparatus for selectively sorting, glass and plastic bottles by weight according to claim 52, wherein said means for applying substantially the same predetermined vertical lifting force includes a plurality of jets of air directed vertically of the intermediate conveyor section, one of said plurality of jets of air being directed at the bottom of each of said plurality of glass and plastic bottles, respectively.

57. The apparatus for selectively sorting glass and plastic bottles by weight according to claim 52, wherein the weight of said glass and plastic bottles determines the degree of vertical lift by said predetermined vertical lifting force and the magnitude of said predetermined vertical lifting force is more than that required to complete the vertical lift of an empty plastic bottle and less than that required to complete the vertical lift of at least partially filled plastic bottles and glass bottles.

58. The apparatus for selectively sorting glass and plastic bottles by weight according to claim 52, wherein said secondary conveyor includes means for propelling said empty plastic bottles away from said water bath.

59. The apparatus for selectively sorting glass and plastic bottles by weight according to claim 58, wherein said means for propelling includes a mechanical conveyor having a receiving slot for gripping a predetermined portion of each empty plastic bottle.

60. The apparatus for selectively sorting glass and plastic bottles by weight according to claim 59, wherein said mechanical conveyor is linearly positioned above the outlet section of said primary conveyor.

61. The apparatus for selectively sorting glass and plastic bottles by weight according to claim 58, wherein said means for propelling includes a series of air jets and parallel guide rails, whereby a portion of each empty plastic bottle is slidable along said guide rails by said series of air jets.

62. The apparatus for selectively sorting glass and plastic bottles by weight according to claim 61, wherein said guide rails are positioned above the outlet section of said primary conveyor and said series of air jets are linearly positioned above of said guide rails.

63. An apparatus for selectively sorting glass and plastic bottles by weight comprising:
- a primary conveyor including an inlet section, an intermediate section, and an outlet section;
- means for supporting a plurality of glass and plastic bottles for linear movement on said primary conveyor;
- a water bath positioned in the intermediate section of said primary conveyor, said water bath imparting a buoyant force to said plurality of glass and plastic bottles;

means for applying substantially the same predetermined vertical lifting force to a bottom end of each of said plurality of glass and plastic bottles within said water bath, whereby the buoyant force imparted to said plurality of glass and plastic bottles by said water bath in combination with said predetermined vertical lifting force raises empty plastic bottles to a predetermined height within said water bath above at least partially filled plastic bottles and glass bottles; and a secondary conveyor positioned above the outlet section of said primary conveyor for gripping and removing the empty plastic bottles at the predetermined height from said at least partially filled plastic bottles and glass bottles, wherein said means for supporting includes a crate evenly partitioned into a plurality of sections for receiving corresponding ones of said plurality of glass and plastic bottles, each of said plurality of sections being at least partially open on a floor of said crate to enable passage of said predetermined vertical lifting force therethrough.

64. The apparatus for selectively sorting glass and plastic bottles by weight according to claim 63, wherein said means for applying a predetermined vertical lifting force includes a plurality of jets of water directed vertically of the water bath, one of said plurality of jets of water being directed at the bottom of each of said plurality of glass and plastic bottles, respectively.

65. The apparatus for selectively sorting glass and plastic bottles by weight according to claim 63, wherein said means for applying a predetermined lifting force includes a plurality of jets of air directed vertically of the water bath, one of said plurality of jets of air being directed at the bottom of each of said plurality of glass and plastic bottles, respectively.

66. The apparatus for selectively sorting glass and plastic bottles by weight according to claim 63, wherein the weight of said glass and plastic bottles determines the degree of displacement within said water bath and the magnitude of said predetermined vertical lifting force is more than that required to complete the vertical displacement of an empty plastic bottle and less than that required to complete the vertical displacement of at least partially filled plastic bottles and glass bottles.

67. The apparatus for selectively sorting glass and plastic bottles by weight according to claim 63, wherein said secondary conveyor includes means for propelling said empty plastic bottles away from said water bath.

68. The apparatus for selectively sorting glass and plastic bottles by weight according to claim 67, wherein said means for propelling includes a series of air jets and parallel guide rails, whereby a portion of each empty plastic bottle is slidable along said guide rails by said series of air jets.

69. The apparatus for selectively sorting glass and plastic bottles by weight according to claim 68, wherein said guide rails are positioned above the outlet section of said primary conveyor and said series of air jets are linearly positioned above said guide rails.

70. The apparatus for selectively sorting glass and plastic bottles by weight according to claim 67, wherein said means for propelling includes a mechanical conveyor having a receiving slot for gripping a predetermined portion of each empty plastic bottle.

71. The apparatus for selectively sorting glass and plastic bottles by weight according to claim 70, wherein said mechanical conveyor is linearly positioned above the outlet section of said primary conveyor.

72. The apparatus for selectively sorting glass and plastic bottles by weight according to claim 63, further including means for limiting said predetermined height and thereby preventing tipping of said empty plastic bottles prior to being gripped by said secondary conveyor.

73. The apparatus for selectively sorting glass and plastic bottles by weight according to claim 72, wherein said means for limiting is a third conveyor positioned above the intermediate section of said primary conveyor, a belt of said third conveyor moving at a speed corresponding to a rate of movement of said primary conveyor.

74. An apparatus for selectively sorting glass and plastic bottles by weight comprising:

a primary conveyor including an inlet section, an intermediate section, and an outlet section;

means for supporting a plurality of glass and plastic bottles for linear movement on said primary conveyor;

a water bath positioned in the intermediate section of said primary conveyor, said water bath imparting a buoyant force to said plurality of glass and plastic bottles;

means for applying substantially the same predetermined vertical lifting force to a bottom end of each of said plurality of glass and plastic bottles within said water bath, whereby the buoyant force imparted to said plurality of glass and plastic bottles by said water bath in combination with said vertical lifting force raises empty plastic bottles to a predetermined height within said water bath above at least partially filed plastic bottles and glass bottles;

a secondary conveyor positioned above the outlet section of said primary conveyor for gripping and removing the empty plastic bottles at the predetermined height from said at least partially filled plastic bottles and glass bottles; and means for limiting a vertical lift and preventing tipping of said empty plastic bottles prior to gripping by said secondary conveyor, wherein said means for supporting includes a crate evenly partitioned into a plurality of sections for receiving corresponding ones of said plurality of glass and plastic bottles, each of said plurality of sections being at least partially open on a floor of said crate to enable passage of said predetermined vertical lifting force therethrough.

75. The apparatus for selectively sorting glass and plastic bottles by weight according to claim 74, wherein said means for applying a predetermined vertical lifting force includes a plurality of jets of water directed vertically of the water bath, one of said plurality of jets of water being directed at the bottom of each of said plurality of glass and plastic bottles, respectively.

76. The apparatus for selectively sorting glass and plastic bottles by weight according to claim 74, wherein said means for applying a predetermined vertical lifting force includes a plurality of jets of air directed vertically of the water bath, one of said plurality of jets of air being directed at the bottom of each of said plurality of glass and plastic bottles, respectively.

77. The apparatus for selectively sorting glass and plastic bottles by weight according to claim 74, wherein said secondary conveyor includes means for propelling said empty plastic bottles away from said water bath.

78. The apparatus for selectively sorting glass and plastic bottles by weight according to claim 77, wherein said means for propelling includes a series of air jets and parallel guide rails, whereby a portion of each of said empty plastic bottles is slidable along said guide rails by said series of air jets.

79. The apparatus for selectively sorting glass and plastic bottles by weight according to claim 78, wherein said guide rails are positioned above the outlet section of said primary conveyor and said series of air jets are linearly positioned above said guide rails.

80. The apparatus for selectively sorting glass and plastic bottles by weight according to claim 77, wherein said means for propelling includes a mechanical conveyor having a receiving slot for gripping a predetermined portion of each of said empty plastic bottles.

81. The apparatus for selectively sorting glass and plastic bottles by weight according to claim 80, wherein said mechanical conveyor is linearly positioned above the outlet section of said primary conveyor.

82. An apparatus for selectively sorting glass and plastic bottles by weight comprising:
  a primary conveyor including an inlet section, an intermediate section, and an outlet section;
  at least one crate member for supporting a plurality of glass and plastic bottles for linear movement on said primary conveyor;
  a water bath positioned in the intermediate section of said primary conveyor, said water bath imparting a buoyant force to said plurality of glass and plastic bottles;
  means for applying substantially the same predetermined vertical lifting force to a bottom end of each of said plurality of glass and plastic bottles within said water bath, whereby the buoyant force imparted to said plurality of glass and plastic bottles by said water bath in combination with said predetermined vertical lifting force raises empty plastic bottles to a predetermined height within said water bath above at least partially filled plastic bottles and glass bottles;
  a secondary conveyor positioned above the outlet section of said primary conveyor for gripping and removing the empty plastic bottles at the predetermined height from said at least partially filled plastic bottles and glass bottles; and
  means for limiting a vertical lift and preventing tipping of said lifted empty plastic bottles prior to gripping by said secondary conveyor, wherein said secondary conveyor includes means for propelling said empty plastic bottles and includes a series of air jets and parallel guide rails, whereby a portion of each of said empty plastic bottles is slidable along said guide rails by said series of air jets.

83. The apparatus for selectively sorting glass and plastic bottles by weight according to claim 82, wherein said means for applying a predetermined vertical lifting fore includes a plurality of jets of water directed vertically of the water bath, one of said plurality of jets of water being directed at the bottom of each of said plurality of glass and plastic bottles, respectively.

84. The apparatus for selectively sorting glass and plastic bottles by weight according to claim 82, wherein said means for applying a predetermined vertical lifting force includes a plurality of jets of air directed vertically of the water bath, one of said plurality of jets or air being directed at the bottom of each of said plurality of glass and plastic bottles, respectively.

85. The apparatus for selectively sorting glass and plastic bottles by weight according to claim 82, wherein said guide rails are positioned above the outlet section of said primary conveyor and said series of air jets are linearly positioned above said guide rails.

86. A method for selectively sorting a plurality of articles by weight comprising the steps of:
  (a) conveying sequential crates of articles, each crate containing a plurality of articles, into a water bath;
  (b) applying substantially the same predetermined vertical lifting force to a bottom end of each of said plurality of articles, whereby the buoyant force applied to each of said plurality of articles in combination with said vertical lifting force raises lighter ones of said plurality of articles to a predetermined height above remaining ones of said plurality of articles;
  (c) extracting vertically lifted and buoyed ones of said plurality of articles from said crate;
  (d) conveying extracted ones of said plurality of articles in a first direction away from said water bath; and
  (e) conveying said crates sequentially out of said water bath.

87. The method for selectively sorting a plurality of articles by weight according to claim 86, wherein said step of applying a predetermined vertical lifting force includes directing at least one jet of water vertically of said water bath at a bottom of each of said plurality of articles as said plurality of articles are conveyed through said water bath.

88. The method for selectively sorting a plurality of articles by weight according to claim 86, wherein said step of applying substantially the same predetermined vertical lifting force includes directing at least one jet of air vertically of said water bath at a bottom of each of said plurality of articles as said plurality of articles are conveyed through said water bath.

89. An apparatus for selectively sorting glass and plastic bottles by weight comprising:
  a primary conveyor including an inlet section, an intermediate section, and an outlet section;
  at least one crate member for supporting a plurality of glass and plastic bottles for linear movement on said primary conveyor;
  a water bath positioned in the intermediate section of said primary conveyor, said water bath imparting a buoyant force to said plurality of glass and plastic bottles;
  means for applying substantially the same predetermined vertical lifting force to a bottom end of each of said plurality of glass and plastic bottles within said water bath, whereby the buoyant force imparted to said plurality of glass and plastic bottles by said water bath in combination with said predetermined vertical lifting force raises empty plastic bottles to a predetermined height within said water bath above at least partially filled plastic bottles and glass bottles;
  a secondary conveyor positioned above the outlet section of said primary conveyor for gripping and removing the empty plastic bottles at the predetermined height from said at least partially filled plastic bottles and glass bottles; and means for limiting a vertical lift and preventing tipping of said lifted empty plastic bottles prior to gripping by said secondary conveyor, wherein said secondary conveyor includes means for propelling said empty plastic bottles and includes a mechanical conveyor having a receiving slot for gripping a predetermined portion of each of said empty plastic bottles.

90. The apparatus for selectively sorting glass and plastic bottles by weight according to claim 89, wherein said mechanical conveyor is linearly positioned above the outlet section of said primary conveyor.

91. The apparatus for selectively sorting glass and plastic bottles by weight according to claim 89, wherein said means for applying a predetermined vertical lifting force includes a plurality of jets of water directed vertically of the water bath, one of said plurality of jets of water being directed at the bottom of each of said plurality of glass and plastic bottles, respectively.

92. The apparatus for selectively sorting glass and plastic bottles by weight according to claim 89, wherein said means for applying a predetermined vertical lifting force includes a plurality of jets of water directed vertically of the water bath, one of said plurality of jets of air being directed at the bottom of each of said plurality of glass and plastic bottles, respectively.

93. The apparatus for selectively sorting glass and plastic bottles by weight according to claim 89, wherein said guide rails are positioned above the outset section of said primary conveyor and said series of air jets are linearly positioned above said guide rails.

* * * * *